United States Patent

Patrick et al.

[11] Patent Number: 5,291,858
[45] Date of Patent: Mar. 8, 1994

[54] SOUND CONDITIONING IN FISH

[75] Inventors: Paul H. Patrick, Milton; Janusz J. Kowalewski, King City; Edward A. McLeod, Keswick; Alexander Sakuta, Toronto; Michael B. Colbert, Mississauga, all of Canada

[73] Assignee: Ontario Hydro, Toronto, Canada

[21] Appl. No.: 45,946

[22] Filed: Apr. 15, 1993

[51] Int. Cl.⁵ .............................................. A01K 61/00
[52] U.S. Cl. .............................................. 119/230
[58] Field of Search ............... 119/3, 5, 51.04, 96; 43/4.5, 17, 17.1

[56] References Cited

U.S. PATENT DOCUMENTS

| | | |
|---|---|---|
| 3,069,797 | 12/1962 | Kreutzer ............... 43/17.1 X |
| 3,815,279 | 6/1974 | Poirot ..................... 43/17 |
| 3,885,338 | 5/1975 | York ..................... 43/17.1 |
| 4,105,992 | 8/1978 | Luciano ................. 43/124 |
| 4,646,276 | 2/1987 | Kowalewski et al. ... 367/139 |
| 4,932,007 | 6/1990 | Suomala ................ 367/139 |
| 4,951,410 | 8/1990 | Ly ......................... 43/17.1 |
| 4,955,005 | 9/1990 | Loeffelman ........... 43/17.1 |
| 4,986,021 | 1/1991 | Thomas ................. 43/14 |
| 5,046,278 | 9/1991 | Szilagyi et al. ........ 43/17.1 |

Primary Examiner—Gene Mancene
Assistant Examiner—Thomas Price

[57] ABSTRACT

The invention provides a method of preconditioning selected species of fish to associate characteristic acoustic signals with food, thereby to induce the fish to congregate towards a selected location in response to such acoustic signals.

7 Claims, 2 Drawing Sheets

SOUND CONDITIONING IN FISH

The present invention relates generally to the conditioning of fish to respond to acoustic signals in a desired manner, and to a method of stimulating a feeding response in fish by means of underwater acoustic signals. The method is applicable both to aquaculture and to the harvesting of fish.

The present invention, according to one of its aspects, relates to a method of enhancing the growth rates of juvenile fish, including larval fish, in an aquatic environment wherein the juvenile fish are nurtured prior to being released to the wild.

It is well known that the encroachment of industrial expansion upon the wilderness is detrimental to the wild environment, resulting in depletion of various animal, bird and fish populations. Such encroachment has become a matter of great environmental concern and various steps have been taken to examine the problem and, where possible, to protect or replace diminished species.

In the case of fish population losses, more particularly in fresh water environments, aquaculture provides an option for the replacement of species at a specific location, as well as a method to preserve biodiversity within an affected watershed. However, existing aquacultural approaches to the problem of nurturing juvenile and larval fish to be released subsequently to the environment call for continuous maintenance and care, including density reductions, of the fish. The existing approaches are highly labor intensive and costly, and therefore generally unacceptable.

The present invention provides an alternative approach to the problem wherein acoustic conditioning is employed to enhance the survival and growth rates of juvenile (including larval) fish, more particularly, but also to enhance the survival rates of adult fish. According to the invention, the method of enhancing the survival and/or growth rates of fish in an aquatic environment comprises:

providing a feeder at a selected location for dispensing food to the aquatic environment, providing an acoustic projector for generating acoustic signals within the frequency range 10Hz–4kHz, ascertaining a frequency within said range to which the fish are preconditioned to respond, periodically dispensing food from the feeder and, at times coordinated with the times at which food is dispensed, actuating the acoustic projector to generate an acoustic signal at said ascertained frequency.

The signal preferably has a duration exceeding one second. The optimum duration will depend upon the response time of the fish and time of travel to the feeder.

The fish can be preconditioned to respond to the acoustic signal, in the same or a different captive aquatic environment, by periodically dispensing food at a selected location of the captive environment and, at times coordinated with the times at which food is dispensed, transmitting acoustic signals through the aquatic environment at said ascertained frequency.

The said frequency to which the fish will respond may be ascertained from data relating to the particular species of fish, if such data are available. Alternatively, the frequency can be ascertained by (i) periodically dispensing food at a selected location in a first captive aquatic environment, (ii) transmitting acoustic signals through the aquatic environment at times coordinated with the times at which food is dispensed, and at a first frequency within said range 10Hz–4kHz, (iii) monitoring the response of a fish sample to said first frequency by observing fish movement towards said selected location during the transmission times, (iv) duplicating steps (i) (ii) and (iii) for like fish samples in respective captive aquatic environments at different acoustic frequencies within said range of 10Hz–4kHz, and (v) selecting the frequency at which the monitored response is greatest.

According to another aspect of the invention, a method of preconditioning fish to congregate towards a selected location in an aquatic environment comprises providing a feeder for dispensing food to the aquatic environment at said location, providing an acoustic projector for generating acoustic signals within the frequency range 10Hz–4kHZ, ascertaining a frequency within said range to which the fish are responsive, periodically dispensing food from the feeder and, at times, coordinated with the times at which food is dispensed, actuating the acoustic projector to generate a signal at said ascertained frequency.

Harvesting of the fish is facilitated if the fish are preconditioned to congregate in this way. Thus, according to yet another aspect of the invention, a method of inducing fish to congregate towards a selected location of an aquatic environment by stimulating a feeding response, whereby to facilitate harvesting of the fish, comprising ascertaining the essential characteristics of an acoustic signal to which the fish are preconditioned to respond, providing an acoustic generator at said selected location for generating an acoustic signal having said essential characteristics, and actuating the acoustic generator to produce said signal.

A preferred embodiment of the invention will now be described, by way of example, with reference to the accompanying drawings, in which.

Figure 1:
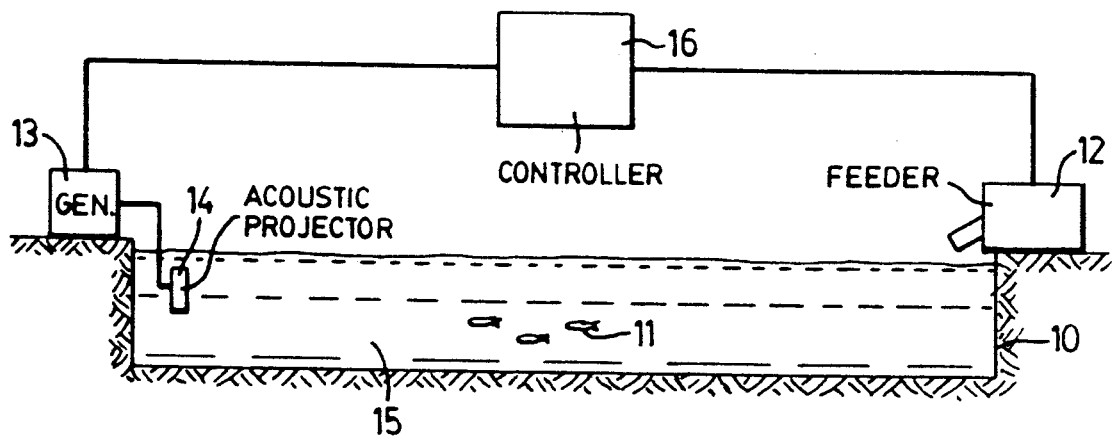
FIG. 1 is a schematic illustration of part of a hatchery, shown in cross section.

Referring to FIG. 1 there is shown a tank or like aquatic environment 10 forming part of a hatchery, for example, in which juvenile or larval fish 11 are nurtured prior to being released to the wild when they are sufficiently large. The arrangement includes a feeder 12 from which food appropriate to the particular fish species is dispensed periodically to the fish at a selected location, and an acoustic generator 13 for generating acoustic signals at a predetermined frequency, the generator being coupled to an acoustic projector 14 which transmits the signals through the water 15 to excite the fish 11. The feeder 12 and the generator 13 are controlled by a controller 16 so as to coordinate the times at which the generator is actuated with the times at which food is dispensed from the feeder.

The frequency of the acoustic signals is chosen to lie within the range 10Hz–4kHz, the lower limit of the range being determined, for practical reasons, by the design of the acoustic projector and the upper limit being determined by the upper limit of the aural response of the fish. In practice, the optimum frequency to which the fish will respond will depend upon the particular species, and will be in the region of 200Hz for walleye, for example, but in any case will generally lie within the range 50Hz–1000Hz. Another constraint on the selection of the optimum frequency is the amplitude of the sound, because the sound must be distributed throughout the tank space at an adequate sound pressure level to ensure that all the fish will respond.

Since the acoustic signals are not in general pure tones, the frequency of an acoustic signal is taken to mean, for the present purpose, that of the predominant frequency component.

In practice the optimum frequency must be one to which the fish will respond by moving towards the location at which food is to be dispensed. Accordingly, the fish must have been conditioned to make such a response. Thus the fish must be preconditioned to associate the acoustic signals with food. This preconditioning of the fish can be accomplished in the same or a different aquatic environment, as hereinafter described. By operating the acoustic generator at the appropriate frequency at times coordinated with the periodic feeding times, one can ensure that all or most of the fish will move towards the feeder location and so obtain an adequate supply of food. The results of this are that the fish grow faster, have an increased survival rate, and are subjected to less stress than would be the case without acoustic conditioning.

Figure 2:
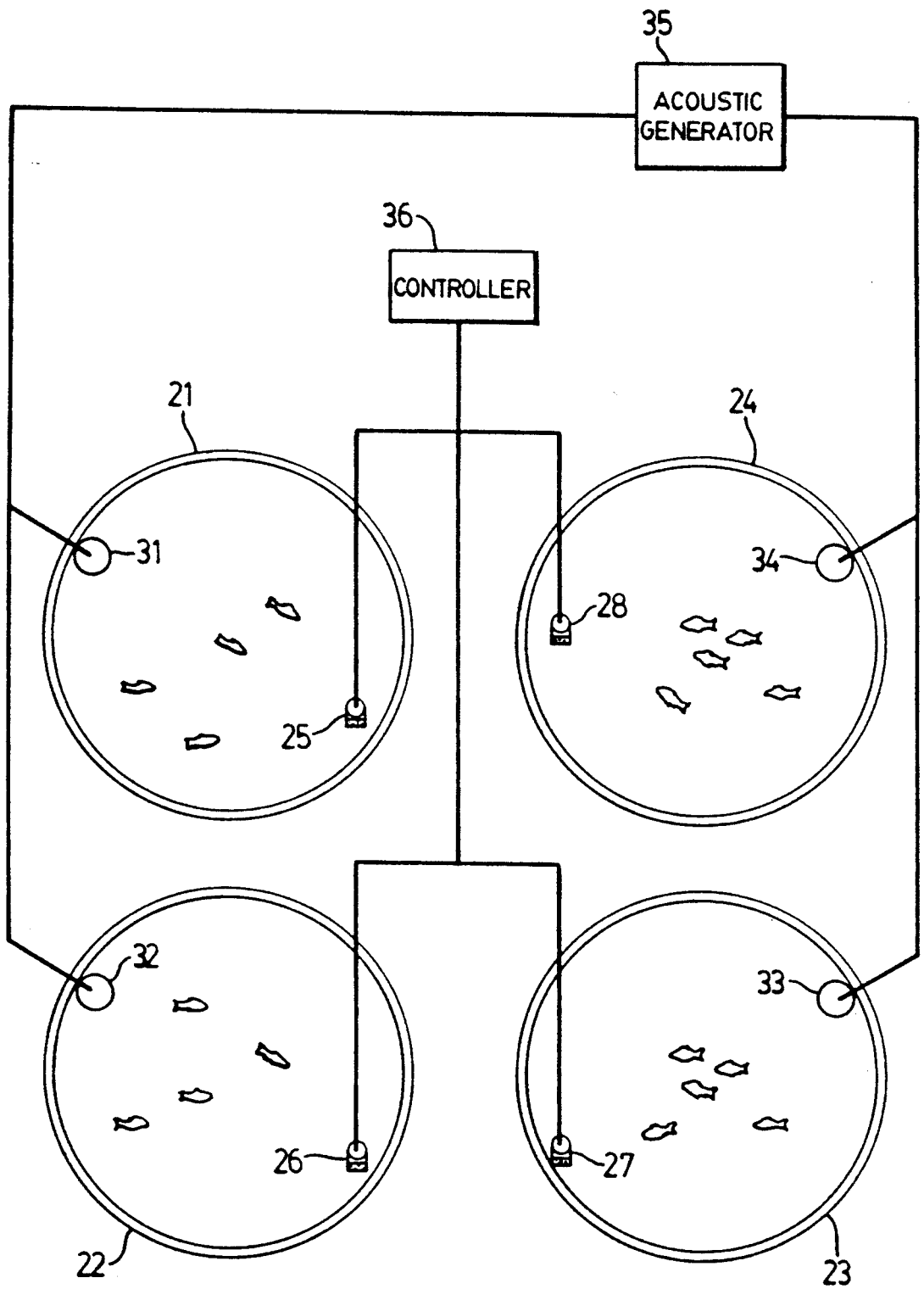
FIG. 2 is a schematic diagram of an experimental arrangement for determining the optimal acoustic signal.

An experimental apparatus for demonstrating the acoustic conditioning of fish is illustrated in FIG. 2. The apparatus comprises four similar tanks 21, 22, 23 and 24, in which are located feeders 25, 26, 27 and 28, respectively. The tanks 21, 22, 23 each house an acoustic projector 31, 32 and 33 respectively, while the tank 24, serving as a control tank, houses a dummy sound source 34. The acoustic projectors 31, 32 and 33 are driven by a generator 35, under the control of a controller 36. The control is such that acoustic signals are projected by the acoustic projectors at times coordinated with the times at which food is dispensed by the feeders.

In the subject demonstration the fish to be conditioned are walleye Istizostedion vitreum). Information on the hearing sensitivity of walleye is not well documented, and at present there is no published audiogram for the species. Since walleye are representatives of the non-ostiophysine group, it is to be expected that their best hearing sensitivities will be in the range 50Hz–500Hz. Accordingly, tonal frequencies of acoustic projectors 31, 32 and 33 were selected to be 600Hz, 300Hz and 200Hz, respectively.

The four tanks were each of 1000L capacity and, half filled, were each stocked with approximately 500 juvenile walleye which had attained a weight of about 1g. The tanks were curtained off to reduce background noise and screen off external movements which could stress the walleye. The fish were fed Bio Kyowa dry feed at 30 minute intervals throughout each 24 hour day at a ration of 3–5% of body weight, i.e. a little above their maintenance diet.

Acoustic conditioning occurred 30 seconds prior to the feeder being turned on in each cycle. The temperatures of the tanks remained approximately equal, at 17°–19° C. throughout a three-month period during which the overhead lighting remained constant. Daily inventories of temperature, feed ration and mortality were made for each tank, and length-weight determinations were made approximately weekly for 60 fish, i.e. samples of 15 fish from each tank.

Figure 3:
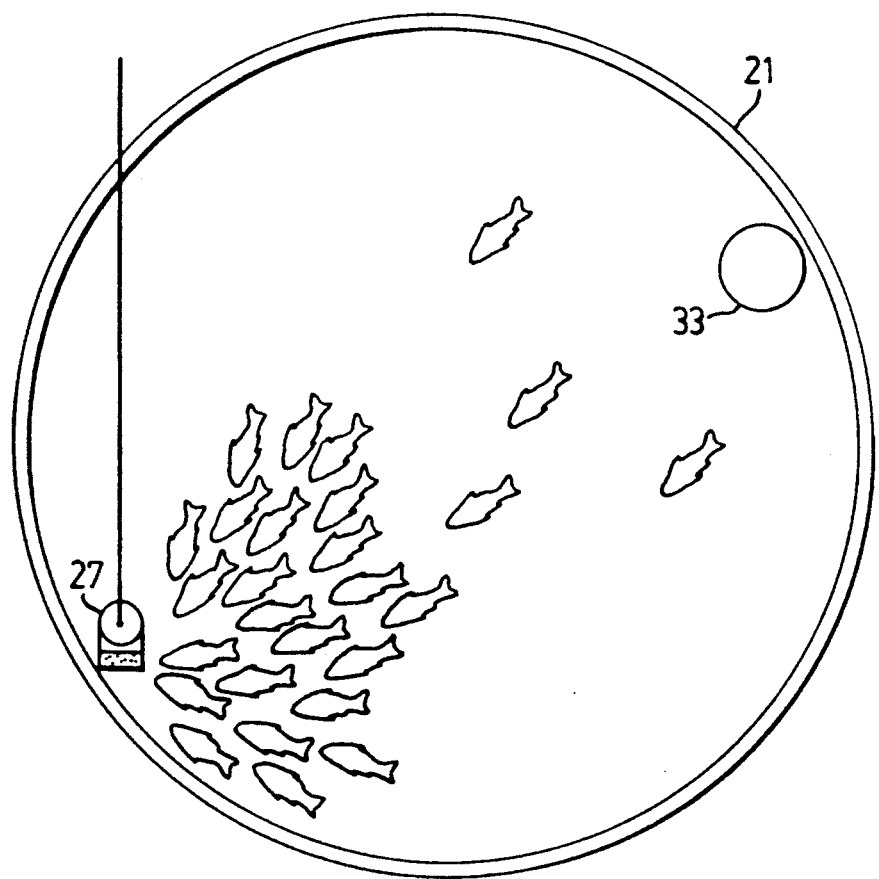
FIG. 3 shows part of the experimental arrangement as the fish respond to applied acoustic signal.

Conditioning was defined when the majority of fish in a tank approached the feeder area when the acoustic source was turned on but before food was dispensed. This effect was quite noticeable as the fish were observed to concentrate in high densities near the feeder, as illustrated in FIG. 3. Conditioning throughout the period was assessed by monitoring fish numbers and their distribution using video equipment. The results showed that the walleye were conditioned in response to frequencies of 200Hz and 300Hz, but not 600Hz. Fish exposed to each of the three frequencies grew at least as fast as, and ultimately faster than, the fish of the control group in the control tank 24, and showed lower mortality rates.

Since an underwater acoustic signal having the appropriate predominant frequency, and preferably a duration exceeding one second, will stimulate a feeding response causing the fish to congregate and move towards a location at which food is expected, the preconditioning of fish in the manner described may be used to facilitate the harvesting of fish in the field. To this one needs to know the essential characteristics, e.g. the predominant frequency, of an acoustic signal to which the fish are preconditioned to respond. The fish can then be assembled for harvesting by producing such an underwater acoustic signal at the appropriate location.

The demonstration described above shows that fish can be preconditioned to respond to acoustic signals at appropriate frequencies so as to approach a feeder in preparedness for the dispensation of food. Furthermore, if the frequency appropriate to a given species is not already known, it can readily be determined by examining the responses of like fish samples at different frequencies.

We claim:

1. A method of enhancing the survival and/or growth rates of fish in an aquatic environment, comprising providing a feeder at a selected location for dispensing food to the aquatic environment,
providing an acoustic projector for generating acoustic signals within the frequency range 10Hz–4kHz,
ascertaining a frequency within said range to which the fish are preconditioned to respond,
periodically dispensing food from the feeder and, at times coordinated with the times at which food is dispensed, actuating the acoustic projector to generate an acoustic signal at said ascertained frequency.

2. A method according to claim 1, said signal having a duration exceeding one second.

3. A method according to claim 1, including the step of preconditioning the fish in a captive aquatic environment by stimulating a feeding response, said preconditioning step comprising periodically dispensing food at a selected location of the captive environment and, at times coordinated with the times at which food is dispensed, transmitting acoustic signals through the aquatic environment at said ascertained frequency.

4. A method according to claim 3, wherein said frequency to which the fish are responsive is ascertained by (i) periodically dispensing food at a selected location in a first captive aquatic environment,
(ii) transmitting acoustic signals through the aquatic environment at times coordinated with the times at which food is dispensed, and at a first frequency within said range 10Hz–4kHz, (iii) monitoring the response of a fish sample to said first frequency by observing fish movement towards said selected location during the transmission times, (iv) duplicating steps (i) (ii) and (iii) for like fish samples in respective captive aquatic environments at different acoustic frequencies within said range of 10Hz–4kHz, and (v) selecting the frequency at which the monitored response is greatest.

5. A method according to claim 1, wherein the fish are of the non-ostiophysine group and said ascertained frequency is in the range 50Hz–1000Hz.

6. A method of preconditioning fish to congregate towards a selected location in an aquatic environment, comprising providing a feeder for dispensing food to the aquatic environment at said location, providing an acoustic projector for generating acoustic signals within the frequency range 10Hz–4kHz, ascertaining a frequency within said range to which the fish are responsive, periodically dispensing food from the feeder and, at times coordinated with the times at which food is dispensed, actuating the acoustic projector to generate a signal at said ascertained frequency.

7. A method according to claim 6, said signal having a duration exceeding one second.

* * * * *